United States Patent Office 3,488,062
Patented Jan. 6, 1970

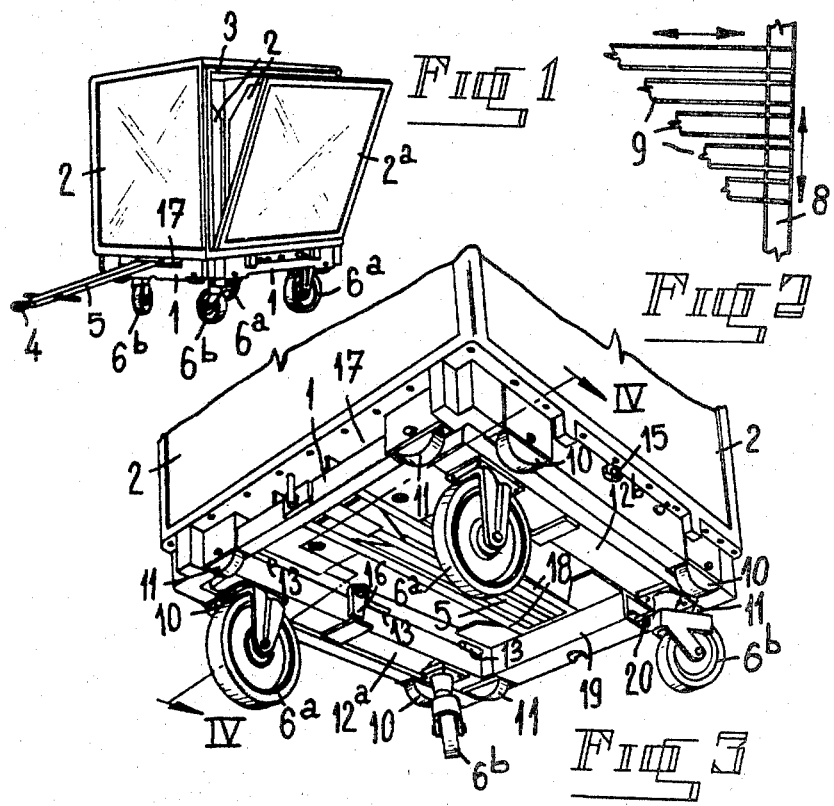
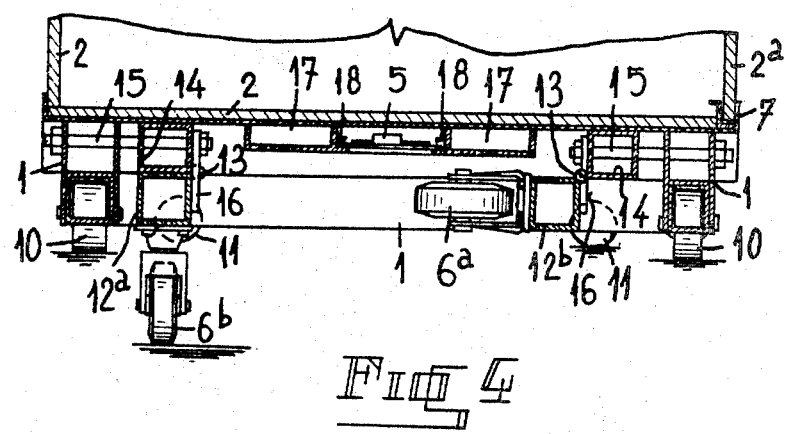

3,488,062
CONTAINER FOR TRANSPORTING GOODS
Fedde Walda, Leendert Sparreboomstraat 15,
Rotterdam, Netherlands
Filed June 24, 1968, Ser. No. 739,475
Claims priority, application Netherlands, June 23, 1967,
6708830
Int. Cl. B62b 3/02; B60b 33/00
U.S. Cl. 280—43          4 Claims

ABSTRACT OF THE DISCLOSURE

A container for transporting goods comprises a frame which is in the form of a horizontal hollow rectangle and is surmounted by a housing provided with at least one shutter. Supporting rollers are rotatably mounted on the frame, and a pair of beams are mounted within the frame to pivot upon axes extending longitudinally of each beam and are located adjacent opposite sides of the frame. A pair of brackets extend from each beam, and a wheel is rotatably mounted in each bracket. The beams are linked together in such a manner that the beams pivot in opposition to one another between a position in which the brackets extend horizontally toward the middle of the frame and a position in which the brackets and wheels extend vertically downward. In the latter position, the peripheries of the wheels extend below the peripheries of the rollers.

Background of the invention

The invention relates to a container for transporting goods in which a housing provided with one or more shutters possesses rollers or wheels enabling the container to be moved.

In recent years containers have been used more and more in the transport of goods, however, the containers now in use are very large and of such a size that only one or two of such large containers can be loaded on a carrier. The loading and unloading of carriers and also the loading and unloading of ships result in difficulties in handling such large containers.

For this reason it is advantageous to make use of containers which as a result of their dimensions and construction can be directly used in transporting goods from their manufacturer to the retail trade without difficulties in loading and unloading the carriers. Further the transport of containers in a factory or in a storehouse must be easy. This means that the containers are to be used independent of the carrier or the ship.

Summary of the invention

The object of the invention is the provision of a container which meets the requirements as listed above, and according to the invention such a container is characterized in that the housing of the container possesses a group of steady rollers and a group of rollers which can be swung or retracted above the point of contact of the steady rollers with the floor, whereas said second group of rollers in their operative position contacts the floor on a level that will be positioned lower than the level of contact with the floor of the steady rollers. This has the advantage that when the container is to be transported on a floor of a storehouse or factory wheels having a large diameter can be used, permitting a movement of the container by hand, even in loaded condition. The provision of wheels having a large diameter has the drawback that the containers when placed upon a carrier or in a ship need too much space in the vertical direction or the height of that part of the container which is to be used for storing the goods would be too small, owing to which the container would become impractical.

When now the wheels having the large diameter can be swung aside the container can be shifted on a carrier or in a ship on its small diameter rollers as in these circumstances no handpower will be necessary and the containers can be shifted by powered means.

According to the invention it is possible that two groups of steady rollers are provided, whereas the points of contact of the both groups of rollers with the floor have a different level. The points of contact with the floor of those both groups of rollers are situated at a higher level than the level of the points of contact of the large diameter wheels with the floor, which wheels can be swung aside. This arrangement allows a movement of the containers in two directions which are perpendicular to each other when the container is placed on rails e.g. in a ship's hold. According to this arrangement the shafts of one of the group of steady rollers cross the shafts of the other group of steady rollers in a right angle. This allows a movement of the containers in closed rows without the need of turning them when the containers are to be positioned in a difinite place.

In a practical embodiment of a container according to the invention the steady rollers are mounted in a frame which is connected to the floor of the container, the sides of which frame are parallel to the sidewalls of the container, whereas the wheels can be swung into a space embraced by the frame. The height of the container is less when the wheels with the large diameter have been swung into the space within the frame. In contradiction thereto the floor of the internal space of the container is at a sufficient height from the ground, when the wheels having the large diameter are in operative position. Loading and unloading the container can be easily performed now when a shutter has been provided in the sidewall of the container. The length and width of the container is about 4 feet and the height of the containers about 4 feet 4 inches. Such dimensions give a good result and permit the situation of two layers of containers on a carrier whereas two rows of containers side by side can be situated on the same carrier. This meets the regulations about the width of carriers in different countries. With the given height of the containers all normal viaducts can be passed with a carrier having two layers of containers.

Brief description of the drawings

FIG. 1 is a perspective view of a container according to the invention;

FIG. 2 shows a diagram of rails over which the container according to the invention can be moved;

FIG. 3 is a bottom view of the container shown in FIG. 1;

FIG. 4 is a cross section according to the lines VI—VI in FIG. 3.

Description of the preferred embodiment

The container shown in FIG. 1 comprises a housing of cubical form, which is mounted on a frame 1. The frame is in the form of a horizontal hollow rectangle and is provided with a structure 7 (FIG. 4) in which plates 2 forming the walls of the housing are fastened. The goods can be stored in the space formed by the plates 2. The wall 2a of the housing is adapted as a shutter and fits watertight in a rabbet 3 of the structure comprising the plates 2. The frame 1, below the bottom of the housing, is provided with a box 17 in which the fork of a fork lift truck can be inserted in order to place the container on a carrier. Further a pole 5 provided with an eye 4 can be shifted into the box. As shown in FIG. 1 the container is provided with large wheels 6a and 6b, of which the wheels 6a are fixed and the wheels 6b have been adapted as pivot wheels. By the provision of the large wheels the container can be drawn with the pole 5 by hand, even when the container is loaded up to a weight of 1500 kg. The provision of the large wheels 6a and 6b has a further advantage when the shutter 2a is removed, because the user of the container need not bend down when loading and unloading the container. In practice the bottom of the container is about 1.5 feet above the floor. When the wheels 6a and 6b have been placed in operative position the container will have a total height of 5.5 feet. Such a height of the container however is disadvantageous when the container is to be positioned in a ship's hold or on a carrier. For these reasons the wheels 6 can be swung away and the construction of the frame will be described with reference to the FIGURES 2, 3, and 4.

The diagram of FIGURE 2 shows rails of a supply- and delivery-conveyor 8, over which the containers can be conveyed in a closed row in which the containers have been positioned with the sidewalls against each other. Cross tracks or rails 9 end in the conveyor track 8, which rails 9 are positioned at a right angle with respect to the conveyor 8. The rails 9 are mounted e.g. on a floor in a ship's hold. When now a closed row of containers is moved over the conveyor 8, the closed row can be laterally displaced and each container rests on a rail 9. This can be performed because the frame 1 is provided with two groups of steady rollers. One group of the rollers is indicated in the drawing by the reference numeral 10 and the other group of rollers is indicated by the reference numeral 11. The rollers 10 and 11 are mounted in a frame which has been positioned against the bottom of the container and the sides of the frame are parallel to the sidewalls 2 of the housing. The rollers 10 are adapted to be used in conjunction with the conveyor 8 and the rollers 11 are adapted to be used in conjunction with the rails 9 in order to allow a displacement of the container in both directions. The rollers 10 and 11 are steady rollers and the group of rollers 10 are positioned lower than the group of rollers 11. The points of contact of the rollers with the floor of both groups of rollers consequently have a different level. In accordance with the arrangement of the rollers 10 and 11 the rails or conveyors 8 and 9 are accordingly adapted and at the places where the rails 9 intersect the rails 8 a vertically movable part of the rail 9 can be provided in order to take over the containers from the conveyor 8 to the rails 9. The rollers 10 and 11 which have only a small diameter allow a displacement of the container over the conveyors or rails 8 and 9, however, they are too small to allow a displacement of the container by hand over a floor of a storehouse or factory when the container is loaded. In order to facilitate a displacement of the container by hand wheels 6a and 6b have been provided. When the rollers 10 and 11 are to be used the wheels 6a and 6b have been swung aside in a space embraced by the frame 1. To perform this a wheel 6a and a wheel 6b have been mounted on a pivotable beam. In the space embraced by the frame 1 there are two beams viz. the beam 12a and the beam 12b. Each beam is rectangular in cross section and is provided with a pivot 13 at one corner of its rectangular cross section. The beams 12a and 12b are connected to supporting members having flat lower surfaces extending within two opposite sides of the frame 1. The inner edges of such surfaces are parallel to the adjacent sides of the frame, and the beams 12a and 12b are pivoted on axes extending along the inner edges of such surfaces by means of their pivots 13. By positioning the pivots 13 near a corner of the beam 12a or 12b it can rest with its upper surface against the flat lower surface of a supporting member 14 when the wheel remains in its operative position, as appears from the left side of FIGURE 4. By this arrangement a sturdy supporting of the wheels 6a and 6b has been obtained. A pin 15 of a lock 16 runs through the circumferential beam of the frame 1 and through the supporting member 14. In the operative position of the beam 12a or 12b a bolt of the lock 16 in the shape of an arm mounted on the pin 15 runs along the sideface of the beam 12a or 12b and the beam cannot pivot into its inoperative position. When the wheels have been swung aside the bolt of the lock runs also along a sidewall of the beam 12 and pivoting into its operative position is also prevented. Both positions have been indicated in FIG. 4 in which the beam 12a remains in an operative position and the beam 12b in its inoperative position. Each pin 15 possesses a head projecting out of the frame 1 and the head can be turned by means of a wrench in order to turn the lock also.

The space embraced by the frame 1 is adapted in such a manner that a box 17 remains between the supporting members 14. A fork of a fork lift truck can be inserted into the box 17. The box 17 is further adapted to take up a pole 5. A guide 18 has been arranged in the box 17, in which guide a cross-bar of the pole 5 can slide. Further another box 19 has been provided in the space embraced by the frame. A pneumatic ram is mounted in the box 19. The beams 12a and 12b are linked together in such a manner that they can make only a movement in opposite directions. Such a link 20 is still visible in FIG. 3. The link 20 is connected to the pneumatic ram, in order to bring the wheels in an operative or an inoperative position. A pneumatic connection has been arranged at the outside of the frame and a line for air under pressure can be connected to the ram, which line is connected to a source of air under pressure which is a part of the equipment of a carrier or a ship. When now the container is rolled on its wheels 6a and 6b and is lifted by the fork lift truck the wheels can be swung into an inoperative position, when the container rests on the fork of the fork lift truck. Further the container can be placed with its rolls 10 on a loading surface of a carrier, after which the container can be displaced in a guide mounted on the carrier.

Referring now to the container, particularly to the shutter 2a, it is to be remarked that the container is also suitable for the transport of deep frozen products by adding elements frozen at 30° below zero and put on the floor of the container. By this the deep frozen goods keep a temperature of at least 20° below zero for a week, e.g. poulttry, ice-cream, meat, fish.

The container according to the invention is also suitable for the transport of various goods and food stuffs, by means of several accessories. The insulated container can be used for food stuffs, subject to deterioration, e.g. cooled fresh vegetables, fresh fruit, fresh meat, fresh eggs, cooled chocolate, flower bulbs and all other cooled food stuffs which are sold at retail. For this purpose the shutter 2a can be exchanged for a shutter, provided with an air-conditioning unit with a small electric motor that can be operated at 12, 24 as well as at 220 volts.

A plug in the shutter by means of a flexible cable enables the installation to be connected with the power supply of motor cars (12 v.), areoplanes (24 v.) as well as with the normal 220 volts supply. Instead of air-conditioning equipment the shutter may be adapted for a vacuum installation. It may have a vacuum pump with a vacuum manometer and it can be connected with 12, 24 and 220 volts.

A third interchangeable shutter can be applied with a sall cooling installation and is deliverable:

For electric connection with thermostat (12, 24 and 220 volts);
For gas-connection.

In a fourth interchangeable shutter a suction and blower installation has been assembled by means of which at the supplier's down (feathers) and kapok are sucked into the container at reduced pressure, e.g. for the furniture-industry. At the furniture factory the contents are blown out again under pressure. By means of a flexible suction pipe the down or feathers are blown directly into the furniture cover during the filling so that in the factory no annoyance is experienced from the working up of the down or kapok.

In a fifth interchangeable shutter also a suction- and force-pump has been assembled for sugar, coffee, cereals, rice, etc.

Moreover a polyester tank can be applied with a capacity of about 1000 litres. It is removable and has a manhole in the top to be locked with a rubber washer ($\phi$ 400 mm.) and a stainless steel 2.5″ tap. This tank can be rolled in and out of the container on nylon rollers and is suitable for various sorts of wine, liqueurs, cognac, spirits, and so on.

Further a polyester inner-container can be used which inner container is slightly funnel-shaped at the bottom and is provided with a slide. When the polyester inner-container is put into the normal container one can easily transport bulk cargo, e.g., sugar, coffee, flour, rice, etc.

With the help of an additional steel loading-case the container can be used for the transport of all metals, e.g. pigs of bronze, tin, copper, lead, ferro-chromium, ferro-silicon, chromium-nickel, aluminium. All pig-metals and cathodes are never longer than three feet, so that the metal inner-case is suitable for all new metals. This steel loading-case too can easily be placed into the standard-container by means of some accessories.

Further these containers are suitable for the transport of fruit and vegetables, direct from the plantation (bananas), the green-houses (tomatoes) or from the open fields (spinach, salad) to a loading-berth on trucks, on condition that rails are constructed in the plantations, green houses and the market-gardens.

There are other goods for which this transport-system is exceedingly appropriate, e.g., cement, chemicals, cattle-fodder.

I claim:

1. A container for transporting goods comprising a frame which is in the form of a horizontal hollow rectangle and is surmounted by a housing provided with at least one shutter, supporting rollers which are rotatably mounted on the frame, a pair of beams which are mounted within the frame to pivot upon axes extending longitudinally of each beam and are located adjacent opposite sides of the frame, a pair of brackets extending from each beam, and a wheel rotatably mounted in each bracket, the beams being linked together in such a manner that the beams pivot in opposition to one another between a position in which the brackets extend horizontally toward the middle of the frame and a position in which the brackets and wheels extend vertically downward, the peripheries of the wheels in the latter position extending below the peripheries of the rollers.

2. A container according to claim 1 wherein the frame comprises supporting members having flat lower surfaces extending within two opposite sides of the frame, the inner edges of such surfaces being parallel to those sides of the frame, and each beam being rectangular in cross section and being pivoted at one corner of its rectangular cross section, on an axis extending along the inner edge of one of such surfaces, whereby each beam in its lowermost position rests against one of such surfaces.

3. A container according to claim 1 wherein the rollers mounted on the frame comprise one group of rollers which are rotatable on parallel axes and have the lowermost points on their peripheries in a common plane, and another group of rollers whose axes are parallel to one another and are perpendicular to the axes of the first group of rollers, and which have the lowermost points on their peripheries in a second common plane lower than the first common plane.

4. A container according to claim 1 wherein the wheels are substantially larger in diameter than the rollers to facilitate movement of the container by hand when it is supported on the wheels.

References Cited

UNITED STATES PATENTS

| | | | |
|---|---|---|---|
| 431,953 | 7/1890 | Pinckney | 280—30 |
| 658,142 | 9/1900 | Dunn | 105—177 |
| 1,014,440 | 11/1912 | Benskin | 280—43.24 |
| 1,800,236 | 4/1931 | Wasson | 105—177 |
| 2,107,639 | 2/1938 | Madison | 105—177 |
| 2,587,324 | 2/1952 | Hursh | 105—177 |
| 2,762,315 | 9/1956 | Talboys | 105—177 |
| 2,814,498 | 11/1957 | Hull | 280—43.24 |
| 2,968,491 | 11/1961 | Wilson | 280—79.1 |
| 3,057,636 | 10/1962 | D'Ettorre | 280—37 |
| 3,182,604 | 5/1965 | Foxx | 105—215 |

LEO FRIAGLIA, Primary Examiner

R. R. SONG, Assistant Examiner

U.S. Cl. X.R.

105—177; 280—79.1